March 25, 1958     R. W. AYER ET AL     2,827,911
FLUID PRESSURE REGULATING VALVE Filed May 25, 1954     2 Sheets-Sheet 1

INVENTORS
ROBERT W. AYER
PARIS H. STAFFORD
DAVID W. JONES
BY *Davis, Hoxie & Faithfull*
ATTORNEYS March 25, 1958 R. W. AYER ET AL 2,827,911
FLUID PRESSURE REGULATING VALVE
Filed May 25, 1954 2 Sheets-Sheet 2

INVENTORS
ROBERT W. AYER
PARIS H. STAFFORD
DAVID W. JONES
BY
ATTORNEYS

United States Patent Office 2,827,911
Patented Mar. 25, 1958

2,827,911

FLUID PRESSURE REGULATING VALVE

Robert W. Ayer, Oyster Bay, N. Y., Paris H. Stafford, Monrovia, Calif., and David W. Jones, Huntington, N. Y., assignors to Kenyon Instrument Company, Inc., Huntington, N. Y.

Application May 25, 1954, Serial No. 432,118

7 Claims. (Cl. 137—81)

This invention relates to fluid pressure regulating valves, and more particularly to an improved regulating valve of the type which is adapted to maintain a substantially predetermined pressure differential between fluids at different points, such as the fluid in the fuel tank of an aircraft and the surrounding atmosphere, regardless of changes in either or both of the fluid pressures.

Heretofore, it has been the usual practice to use the "balanced" poppet-type of valve for precise regulation of the pressure differential between a fluid in a container and the fluid surrounding it. The common method of actuating such poppet valves within extremely close limits of pressure variation has been to utilize a pressure differential sensing device, such as a Sylphon, to detect small changes in the pressure inside the tank as compared to the outside pressure (or vice versa) and convert these detections into power actuation of the poppet valve. The power is usually derived from the pressure differential between the inside and the outside of the container itself, provided that the actuating means are not too bulky and the pressures are not too low. Devices of this kind, although workable, are generally complicated and subject to failures.

The regulation of the gas pressure in modern aircraft fuel tanks is an example of the application of pressure differential regulating valves. In this example, the regulation presents a difficult problem due to the severe conditions encountered. For example, during most flight conditions, the rate of boiling of the fuel goes all the way from zero (while standing at about sea level at low temperatures) to a vapor or gas production rate as high as 350 cubic feet per minute (for the average size modern lighter aircraft tank, and at high altitudes and high temperatures). Obviously, this large volume of vapor must be dumped overboard to prevent undue pressures occurring inside the fuel tanks. Most modern aircraft employ a fuel tank consisting of a bag of flexible liquid-proof material suported inside the aircraft structure, either in the wing or in the fuselage. In some cases they are made bullet-proof, in which case they can withstand moderate internal pressures, but in no case can they withstand but very little external pressure before they will collapse if partially emptied. Furthermore, it is not practicable to allow high tank internal pressures because of the likelihood of damage to or deflection of the aicraft structure.

The problem is further complicated by the fact that modern aircraft will climb as fast as 50,000 feet per minute and dive at a rate much higher than this. Accordingly, the rate of change of outside air pressure in which the aircraft is operating will change in the order of 12-24 pounds per square inch per minute. Thus, the internal pressure of the tank must adjust itself, at all times and under all flight conditions, to a specified differential with respect to outside air pressure. In some instances, for example, it will be desired to maintain a nominal three pounds per square inch positive differential pressure between the inside of the tank and the static air pressure in which the aircraft is operating at any time. As the aircraft changes altitude, either the gases within the tank must exhaust from it at extremely high rates of flow, or air must be forced into the tank at equally high rates of flow, although in the latter case the conditions may be such as to cause the boiling rate of the fuel to provide the volume of gas necessary.

Another factor tending to complicate the problem is the desire to avoid mixing incoming air with fuel vapor inside the tank, so as to prevent formation of an explosive mixture. In some cases, it is required that all "ram" or balancing air be excluded from the tank unless it is absolutely necessary to keep the tank from collapsing. Consequently, while the regulating valve itself, if provided with enough vapor from fuel boiling, will regulate the tank differential pressure to perhaps a nominal three pounds, nevertheless in the event of a sudden dive with a resulting sharp increase in outside air pressure, it is desirable to prevent the valve from opening the ram air source until the pressure in the tank becomes exactly zero.

An additional requirement has occasionally been introduced, further complicating the problem. That is, in same instances it is desirable that the tank pressure be capable of being dumped to zero at the will of the pilot or other operator. Also, it is occasionally necessary to eliminate any tank differential pressure below certain altitudes.

The principal object of the present invention is to provide a differential pressure regulating device which will overcome the difficulties and meet the requirements mentioned above, in a more effective manner than has been possible heretofore, and which, at the same time, is relatively simple and inexpensive in construction.

The regulating device of the present invention utilizes a piston slidable within a tube or pipe leading to the fuel or other tank, the front or tank end of the piston being subjected to the internal pressure in the tank, and the rear end of the piston being subjected to outside or ambient air pressure. The pipe has a vent opening adapted to be covered and uncovered by the sliding piston. A fluid pressure duct leads into the pipe at the end of the piston remote from the tank, to admit the ambient pressure into the pipe, whereby the pressure from this duct and from the fuel tank or container exert opposing force on the piston. A biasing device, such as a spring, acts upon the piston in the direction to oppose the pressure from the container and resist uncovering of the vent opening by the piston. When the container pressure exceeds a certain amount in relation to the ambient pressure, it forces the piston rearward against the biasing device and the ambient pressure so as to uncover the vent opening and allow escape of gas from the container. When the desired differential pressure is restored, the biasing device moves the piston forward to close the vent opening. Thus, the piston itself becomes a sensing device sensing the pressure differentials between the inside of the container and the ambient; and the sensitivity of the piston depends upon the spring rate included in the biasing device. For example, if a long weak spring is used, there will be a large amount of piston movement for very small changes in pressure differential. The vent opening in the pipe preferably extends a substantial distance parallel to the piston movements, so that with a long spring rate for the biasing device an extremely precise pressure differential can be held in spite of enormous variations in the flow demand.

The duct supplying ambient air to the piston, for opposing the pressure from the container, may communicate with the vent opening so that it receives air from a source to which the vent opening discharges, or it may lead from a separate source.

In a preferred form of the new regulator, the piston is in the form of a cup having its open end communicating, by way of the pipe, with the interior of the container; and the cup is provided with an opening in its side wall adapted to align with a fluid pressure source in a certain position of the cup. The latter source may be the vent opening itself, in which case the cup is slidable by pressure from the container so that the open end of the cup uncovers the vent opening to exhaust gas from the container, and is slidable in the opposite direction (when the container pressure is too low) to align the side opening of the cup with the vent opening and thus allow air to enter the container by way of the cup and the pipe.

Preferably, the regulator is arranged to admit ram air from a separate source into the container when the container pressure tends to decrease too rapidly in relation to the ambient pressure, as when an aircraft is diving. For this purpose, the ram air is obtained from a second duct leading into the pipe in which the piston slides, and the latter is cup-shaped and provided with an opening in its side wall, as previously described. In this case, the cup movements are effected as before, by variations in the relative pressures of the container fluid acting through the open end of the cup and the opposing pressure from the first duct acting on the closed end of the cup and supplemented by the force of the biasing device. However, when the ambient pressure becomes sufficiently great relative to the container pressure, the resulting unbalance of the forces on the cup causes it to slide against the container pressure to align its side opening with the inlet port of the pipe to which the ram duct leads, while covering the vent opening in the pipe, whereby air is rammed into the cup and through the pipe to the container. Upon restoring of the desired pressure differential as determined by the force of the biasing device, the cup slides in the opposite direction under the increased pressure from the container and thus covers both the inlet port from the ram duct and the vent opening. If the container pressure becomes too great relative to the ambient pressure, the cup slides under the greater pressure against the biasing device and the ambient pressure acting upon the closed end of the cup, so that the open end of the cup uncovers the vent opening while the inlet port for the ram air remains covered by an intermediate portion of the cup. Consequently, the container pressure is lowered by exhaust of container fluid through the vent opening.

In order to permit dumping of the container pressure, the regulator may include means for uncovering the vent opening independently of variations in the opposing fluid pressures to which the piston is subjected from the container and the ambient pressure duct. Preferably, such means comprise a rod having a sliding connection with the cup-shaped piston, so that in one position of the rod the piston can operate in the normal manner in response to variations in the pressure differential of the opposing fluid pressures acting upon it, while in another position of the rod the piston is held positively in position to uncover the vent opening. This control rod may be connected to a manually operated actuating device, or an automatically operated device such as an aneroid, or both.

If desired, the piston may be made of two telescoping and relatively slidable parts, the inner part being a cup-shaped piston element as previously described and the outer part being a sleeve slidable by the cup to uncover the vent opening under the pressure from the container. The sleeve has an inlet port affording communication between the ram air duct and the container, preferably by way of an opening in the side of the cup leading to the cup interior and the pipe, and the cup is reciprocable in the sleeve to make and break this last communication. A second biasing device acts upon the cup-shaped piston element in the direction to break this last communication. Thus, the opposing fluid pressures from the container and the ambient pressure duct can slide the cup within the outer sleeve so as to connect the container to or disconnect it from the ram air duct, while the sleeve covers the vent opening, and can also slide the cup to actuate the sleeve in either direction to cover or uncover the vent opening while the cup covers the inlet port from the ram air duct. In this embodiment of the invention, the outer sleeve may have a sliding connection with an actuating rod, as previously described, to permit dumping of the container pressure by moving the sleeve to uncover the vent opening, irrespective of the opposing fluid pressures on the cup or piston.

For a better understanding of the invention, reference may be had to the accompanying drawings, in which.

Figure 1:
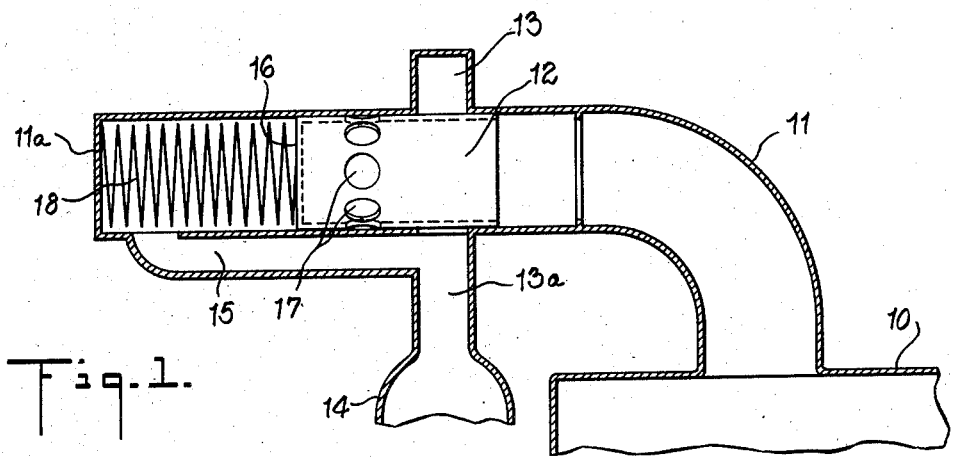
Fig. 1 is a schematic view of one form of the new regulator.

Referring to Fig. 1, the reference numeral 10 designates a closed container in which the fluid pressure is to be maintained at a predetermined differential above an ambient pressure. By way of example, the container 10 may be considered as the fuel tank of an aircraft, it being understood that there is a space in the upper part of the tank containing a vapor or gas, the pressure of which is to be regulated in relation to the surrounding atmospheric or other ambient pressure. A pipe 11 leads from the upper part of the tank and has a horizontal portion containing a piston 12. This piston is slidable within a part of the pipe having an annular enlargement 13 forming a vent opening 13a leading to a conduit 14. The end of the piston 12 remote from the tank 10 is subjected to the ambient pressure derived from a duct 15 leading into the pipe near the end thereof, where it is closed as shown at 11a. In this case, the duct 15 communicates with the vent opening 13a and the conduit 14, so that the latter serves both as a source of the ambient pressure acting upon the piston end which is remote from the tank, and as a means for receiving the discharge from the vent opening 13a. It will be understood, however, that the duct 15 may be connected to a separate source of ambient pressure, so that the conduit 14 may lead to any point for handling the discharge from the vent opening 13a.

As shown in Fig. 1, the piston 12 is cup-shaped and has its open end communicating through the pipe 11 with the tank 10, the closed end 16 of the cup being opposite the closed end 11a of the pipe. Intermediate its ends, the side wall of the cup 12 is formed with a series of circumferentially spaced openings 17. A biasing device 18 acts upon the cup to urge it to the right as seen in Fig. 1, that is, against the pressure from tank 10. This biasing device is shown as a coiled spring interposed between the closed end 11a of the pipe and the closed end 16 of the cup-shaped piston.

When the desired differential exists between the fluid pressure in tank 10 and the ambient pressure in duct 15, the piston 12 assumes the position illustrated in Fig. 1, wherein the part of the piston between its open end and its side openings 17 covers the vent opening 13a. In this position of the piston, the pressure from tank 10 balances the pressure from duct 15 and the force of the biasing device 18. When the tank pressure becomes too high in relation to the ambient pressure, the piston slides to the left against the force of the biasing device 18 and the ambient pressure from duct 15, thereby uncovering the vent opening 13a and permitting fluid to exhaust from the tank into conduit 14. Upon restoring of the desired pressure differential, spring 18 and the ambient pressure act upon the closed end of the cup to slide the latter to the right and close the vent opening 13a. If the tank pressure becomes too low in relation to the ambient pressure, the cup 12 is moved further to the right by the predominating pressures from the duct 15 and biasing device 18, so as to align the side openings 17 of the cup with the annular portion 13 of the pipe and the vent opening 13a. Thereupon, fluid from the conduit 14 enters the tank by way of vent opening 13a, cup openings 17 and pipe 11. The cup 12 is then returned to its illustrated position when the desired pressure differential has been restored.

Figure 2:
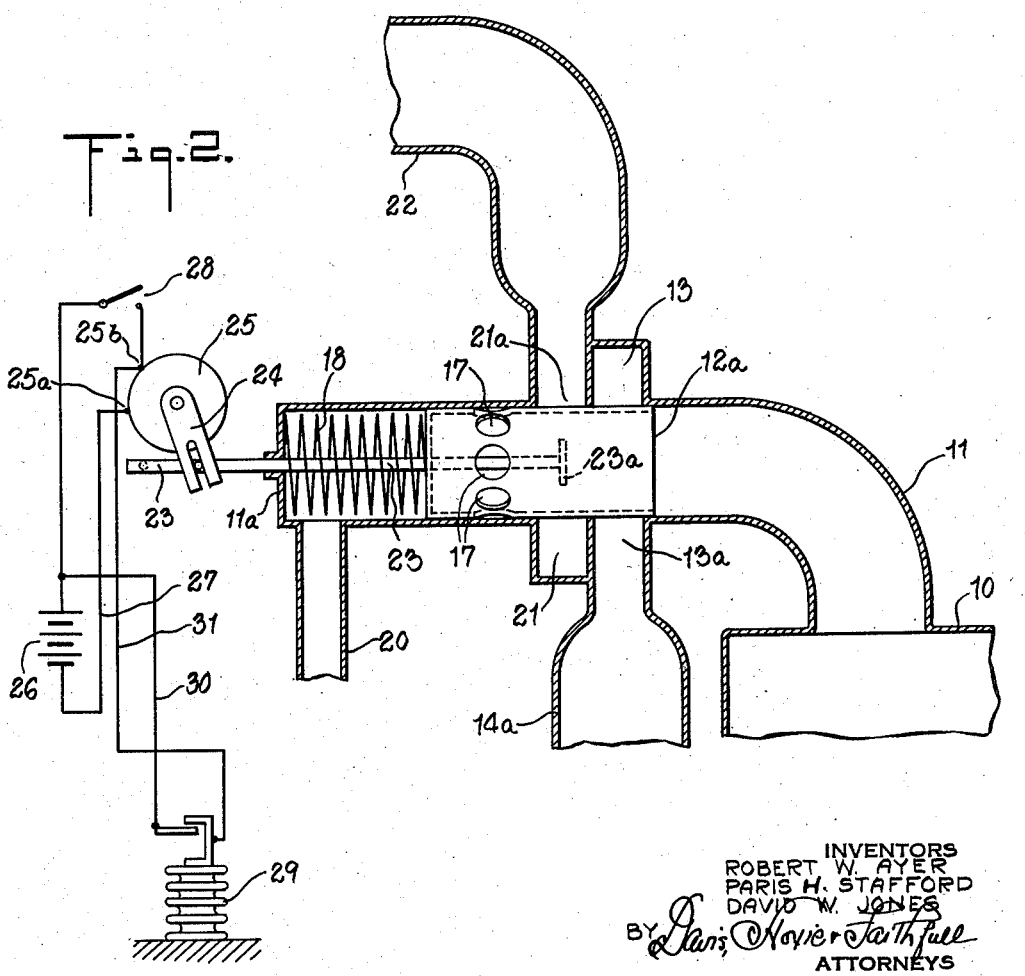
Figs. 2, 3 and 4 are similar views of modified forms of the regulator.

Referring now to Fig. 2, the regulator there shown has a separate duct 20 for supplying the ambient pressure to the closed end of pipe 11, and the vent opening 13a communicates with a separate conduit 14a leading to any suitable point (not shown) for receiving the discharge through the vent opening. In this embodiment, the pipe 11 has a second annular portion 21 located adjacent the annulus 13 and communicating with a second duct 22 for supplying ram air to the tank 10 when the pressure therein becomes too low. The pipe annulus 21 forms a ram air inlet port 21a leading into the pipe 11 between the vent opening 13a and the ambient pressure duct 20. It will be observed that the part of the cup-shaped piston 12a lying between its open end and its side openings 17 is of sufficient length to cover the vent opening 13a and the inlet port 21a simultaneously. A rod 23 extends through the closed end 11a of the pipe and through the coil spring 18 and has a sliding connection with the closed end of the cup 12a. As shown, the rod extends through the closed end of the cup and has an enlargement 23a within the cup, it being understood that the closed ends of both the cup and the pipe have suitable seals surrounding the rod to prevent leakage while permitting sliding of the rod. The outer end of rod 23 is connected to the forked end of a lever 24 mounted on a rotatable actuating device 25, which is shown as being of the electrical type such as a solenoid. The electrical actuator 25 is connected in a circuit including a current source 26 connected at one side by a wire 27 to one of the actuator terminals 25a. The other side of the current source is connected through a control switch 28 to the other terminal 25b of the actuator. An aneroid-operated switch 29 is connected across the manually operated switch 28 by wires 30 and 31.

In the operation of the regulator shown in Fig. 2, the lever 24 is normally in the position shown in full lines, so that rod 23 is in its innermost position in the pipe 11. In this position of the rod, the piston cup 12a is free to slide back and forth. Thus, in the intermediate position of the cup, which it assumes when the tank fluid is at the desired pressure relative to the ambient pressure, both the vent opening 13a and inlet port 21a are covered. Upon decrease of the ambient pressure or increase of the tank pressure, or both, the cup 12a is forced outward to the left against spring 18 and the ambient pressure, so that the open end of the cup uncovers the vent opening 13a and allows escape of fluid from the tank into the conduit 14a while the inlet port 21a remains covered. If the tank pressure becomes too small in relation to the ambient pressure, the piston cup is moved in the opposite direction to align its side openings 17 with the inlet port 21a while covering the vent opening 13a, whereupon air from duct 22 is rammed into the tank. When the pilot or other operator desires to dump the tank pressure for any reason, the switch 28 is closed so as to energize the actuator 25 and move the lever 24 to its dotted line position, whereby the enlargement 23a on the rod engages the closed end of the piston cup and moves the latter outward or to the left in pipe 11. In this way, vent opening 13a is uncovered by the open end of the piston cup, regardless of the pressure differential existing between the fluid in tank 10 and the ambient. Opening of switch 28 de-energizes the actuator 25 so that spring 18 returns the piston cup to its normal operating position. When the ambient pressure exceeds a predetermined value, as when the aircraft descends to a certain level, the aneroid switch 29 closes automatically to energize the actuator 25, thereby connecting the tank interior to the outside atmosphere through vent opening 13a, as previously described, and eliminating any tank differential pressure. The piston cup 12a is again restored to its normal operating position when the outside pressure becomes less than the predetermined value, thus allowing the aneroid switch 29 to re-open.

Figure 3:
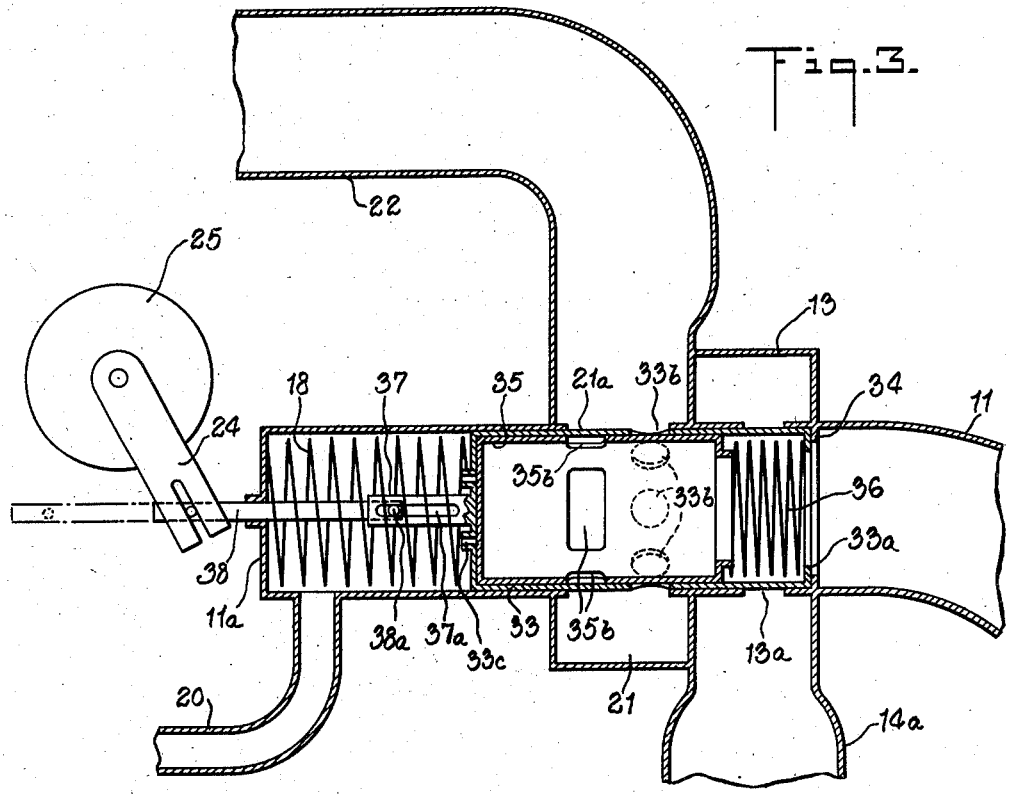

The regulator shown in Fig. 3 is generally similar to that of Fig. 2 except for the form of the piston. As shown in Fig. 3, the piston comprises an outer sleeve 33 slidable in the pipe 11, and an inner cup-shaped piston element 35 slidably mounted in the sleeve. The inner end portion of the sleeve, which is adapted to cover and uncover the vent opening 13a, has a lip 33a engageable with a stop or flange 34 in the pipe 11, to limit the inward movement of the sleeve. Intermediate its ends, the sleeve 33 has a series of circumferentially spaced inlet ports 33b which, in all of the normal operating positions of the sleeve, communicate with the elongated inlet port 21a by which the ram air duct 22 communicates with the interior of pipe 11. The end of the sleeve 33 opposite the closed end 11a of the pipe is partially closed but provided with openings 33a. These openings admit ambient pressure from duct 20 into the sleeve at the closed end of the piston cup.

The piston cup 35 is provided intermediate its ends with circumferentially spaced side openings 35b which are adapted to align with the side openings 33b in the surrounding sleeve. A second biasing device, in the form of a coil spring 36, is interposed between the open end of the piston cup 35 and the lip 33a on the corresponding end of the sleeve 33. Thus, the spring 36 tends to force the piston cup to the left in the sleeve against the sleeve end containing the openings 33c.

A central hollow boss 37 projects outwardly from the partially closed end of the sleeve and has a longitudinal slot 37a. A rod 38 is connected at its outer end to the forked end of the lever 24 of actuator 25, while the inner end of the rod extends into the boss 37 and has a pin 38a projecting into the slot 37a, to form a sliding connection between the rod 38 and the sleeve 33.

In the operation of the Fig. 3 regulator, assuming that the desired differential exists between the pressures in the ambient pressure duct 20 and the part of pipe 11 communicating with the tank, the parts will be in the positions shown in Fig. 3. As there shown, the open end portion of sleeve 33 covers the vent opening 13a, while the piston element 35 covers the inlet ports 33b of the piston. If the tank pressure becomes too great in relation to the ambient pressure, the piston element 35 forces sleeve 33 to the left against the biasing device 18 and the ambient pressure from duct 20. As a result, the vent opening 13a is uncovered to allow escape of fluid from the tank. When the desired pressure differential has been restored, the biasing device 18 and the pressure from duct 20 move sleeve 33 to the right to close the vent opening. If the tank pressure becomes too small in relation to the ambient pressure, the latter pressure, acting through duct 20 and sleeve openings 33c, force the piston 35 to the right against the action of spring 36, until the side openings 35b of the piston align with the side openings 33b of the surrounding sleeve. Thereupon, air from duct 22 is rammed through these aligned openings into the cup 35 and the tank by way of pipe 11. When the desired pressure differential has been restored, the spring 36 and the pressure from tank 11 force the piston 33 to the left to cover the ram air inlet ports 33b. When the actuator 25 is operated, as by means of the aneroid switch or manual switch previously described, the rod 38 is drawn outward to engage the projection 38a with the outer end of slot 37a and draw the sleeve 33 outward so as to uncover the vent opening 13a, thereby dumping the pressure in the tank. When the actuator 25 releases the rod 38, the spring 18 returns the parts to their normal operating positions.

Figure 4:
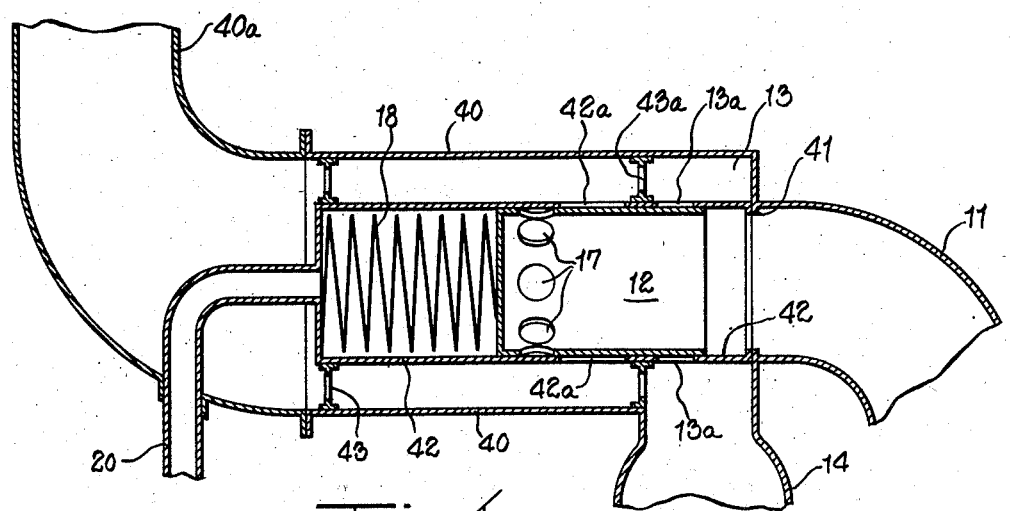

Referring now to Fig. 4, the pipe 11 leading from the tank (not shown) has an enlarged portion 40, one end of which is tightly connected to the main part of the pipe as shown at 41. The other end of the enlargement 40 is connected to a ram air duct 40a. Within the pipe enlargement 40 is a stationary sleeve 42 which is likewise secured tightly at one end to the main pipe section 11, as shown at 41. One end of the sleeve 42 opens directly into the pipe 11, while the opposite end is closed except for its communication with the ambient pressure duct 20. Near its open end, the sleeve 42 is provided with vent openings 13a through which the interior of the sleeve communicates with the annular portion 13 formed by the pipe enlargement 40. This annular portion 13 leads into the conduit 14 for receiving the discharge from the vent openings. Between the vent openings 13a and the ambient pressure duct 20, the sleeve 42 is provided with circumferentially spaced inlet ports 42a communicating with the annular space between the pipe enlargement 40 and sleeve 42, this space, in turn communicating with the ram air duct 40a. A radial partition 43 has a suitable gland in which the cup-shaped piston 12 is slidable, and this partition serves to separate the vent openings 13a from the inlet ports 42a. The biasing spring 18 is interposed between the closed end of the piston cup 12 and the partially closed end of sleeve 42.

The operation of the regulator disclosed in Fig. 4 is similar to that of the regulator illustrated in Fig. 2, although it will be observed that the ram air from the duct 40a enters the regulator axially and passes to the inlet ports 42a around the sleeve 42, the supporting spider 43 permitting such flow. This arrangement is sometimes desirable because of the difficulty in providing a ram air duct which extends radially from the regulator near its central portion.

We claim:

1. The combination of a closed container for a fluid, a pipe communicating with the container for conducting a gaseous fluid to and from the container to regulate the pressure therein, said pipe having a vent opening and an inlet port, a piston slidable in the pipe and being in the form of a cup having its open end subjected to the pressure in the container, the cup having an inlet opening in its side wall adapted to align with said port, a fluid pressure duct leading into the pipe at the closed end of the cup, whereby the pressures from said duct and container exert opposing forces on the cup, said inlet port being located intermediate the vent opening and said duct in the longitudinal direction of the pipe, a second duct leading to the inlet port and containing a fluid at higher pressure than that in said first duct, the cup being movable by variations in the fluid pressure differential at its opposite ends to a first position for aligning said inlet port and inlet opening while covering the vent opening, a second position for uncovering the vent opening while covering the inlet port, and an intermediate position for covering both the vent opening and the inlet port, a biasing device acting upon the cup in the direction to oppose the pressure from the container and resist uncovering of the vent opening by the cup, and means for uncovering said vent opening independently of said variations in pressure differential.

2. The combination according to claim 1, in which said means include a rod having a sliding connection with the cup.

3. The combination according to claim 1, in which said means include a pressure-responsive device operatively connected to the cup.

4. The combination of a closed container for a fluid, a pipe communicating with the container for exhausting gas therefrom, said pipe having a lateral vent opening, a piston slidable in the pipe and adapted to cover and uncover said vent opening, the piston being subjected at one end to the gaseous pressure in the container, a fluid pressure duct leading into the pipe at the opposite end of the piston, whereby the pressures from said duct and container exert opposing forces on the piston, a biasing device acting on the piston in the direction to oppose the pressure from the container and resist uncovering of the vent opening by the piston, a second duct leading into the pipe at an inlet port thereof intermediate said first duct and the vent opening, the second duct containing fluid at a pressure higher than that in the first duct, said piston being in the form of a cup having its open end communicating with the container by way of said pipe, the cup having an inlet opening in its side wall adapted to align with the inlet port while the open-ended portion of the cup covers the vent opening, the cup being slidable against the biasing device to uncover the vent opening and cover said inlet port, and the portion of the cup intermediate said inlet opening and open end being of sufficient length to cover said port and vent opening simultaneously.

5. The combination according to claim 4, in which the second duct surrounds the pipe.

6. The combination of a closed container for a fluid, a pipe communicating with the container for exhausting gas therefrom, said pipe having a lateral vent opening, a piston slidable in the pipe and adapted to cover and uncover said vent opening, the piston being subjected at one end to the gaseous pressure in the container, a fluid pressure duct leading into the pipe at the opposite end of the piston, whereby the pressures from said duct and container exert opposing forces on the piston, a biasing device acting on the piston in the direction to oppose the pressure from the container and resist uncovering of the vent opening by the piston, the piston including a sleeve and a piston element slidable in the sleeve, the sleeve being adapted to cover the vent opening and being slidable by the piston element to uncover the vent opening under the pressure from the container and against the action of the biasing device and the pressure from said duct, a second duct leading into the pipe intermediate the vent opening and said first duct and containing a fluid at a pressure greater than that in the first duct, the sleeve having an inlet port affording communication between the second duct and the container by way of the pipe, the piston element being reciprocable in the sleeve to make and break said last communication, and a second biasing device acting upon the piston element in the direction to break said last communication.

7. The combination according to claim 6, comprising also an actuating member operatively connected to the sleeve for sliding the same to uncover the vent opening independently of said piston element.

References Cited in the file of this patent

UNITED STATES PATENTS

| | | |
|---|---|---|
| 1,094,267 | Sullivan | Apr. 21, 1914 |
| 1,338,562 | Doyle | Apr. 27, 1920 |
| 1,406,216 | Olson | Feb. 14, 1922 |
| 1,879,020 | Balsiger | Sept. 27, 1932 |

FOREIGN PATENTS

| | | |
|---|---|---|
| 679,042 | Great Britain | Sept. 10, 1952 |